United States Patent

[11] 3,612,620

[72] Inventor Hugh E. Riordan
Ann Arbor, Mich.
[21] Appl. No. 859,771
[22] Filed Sept. 22, 1969
[45] Patented Oct. 12, 1971
[73] Assignee Kelsey-Hayes Company
Romulus, Mich.

[54] SKID CONTROL SYSTEM
10 Claims, 7 Drawing Figs.
[52] U.S. Cl. .................................................... 303/21 P,
188/181 A, 303/20
[51] Int. Cl. ...................................................... B60t 8/12
[50] Field of Search ............................................ 188/181;
303/21, 20; 307/121; 314/162; 340/262

[56] References Cited
UNITED STATES PATENTS

| 3,235,036 | 2/1966 | Meyer et al. | 188/181 C |
| 3,362,757 | 1/1968 | Marcheron | 303/21 A4 |
| 3,398,995 | 8/1968 | Martin | 303/21 A4 |
| 3,494,670 | 2/1970 | Leiber | 303/21 F |
| 3,494,671 | 2/1970 | Slavin et al. | 303/21 A4 |
| 3,511,542 | 5/1970 | Fielek, Jr. | 303/21 |

Primary Examiner—Milton Buchler
Assistant Examiner—Stephen G. Kunin
Attorney—Harness, Dickey & Pierce ABSTRACT: A skid control system for a wheeled vehicle in which the brake pressure is released at or near the point of optimum retarding force comprising a rate of change of wheel angular deceleration detecting circuit including a zero detector and delay circuit which provides a control signal indicative of optimum braking to a brake pressure modulator which releases the brakes upon receipt of the control signal and an incipient skid signal generated upon detection of wheel deceleration exceeding a predetermined level, and a timed deactivator which deactivates the brake pressure modulator at a predetermined time after pressure is released. A speed modulator and mu detector, may be optionally provided, which adjust the delay interval in accordance with vehicle speed and mu between the wheel and the road surface so that the delay is decreased at low vehicle velocities or low mu conditions.

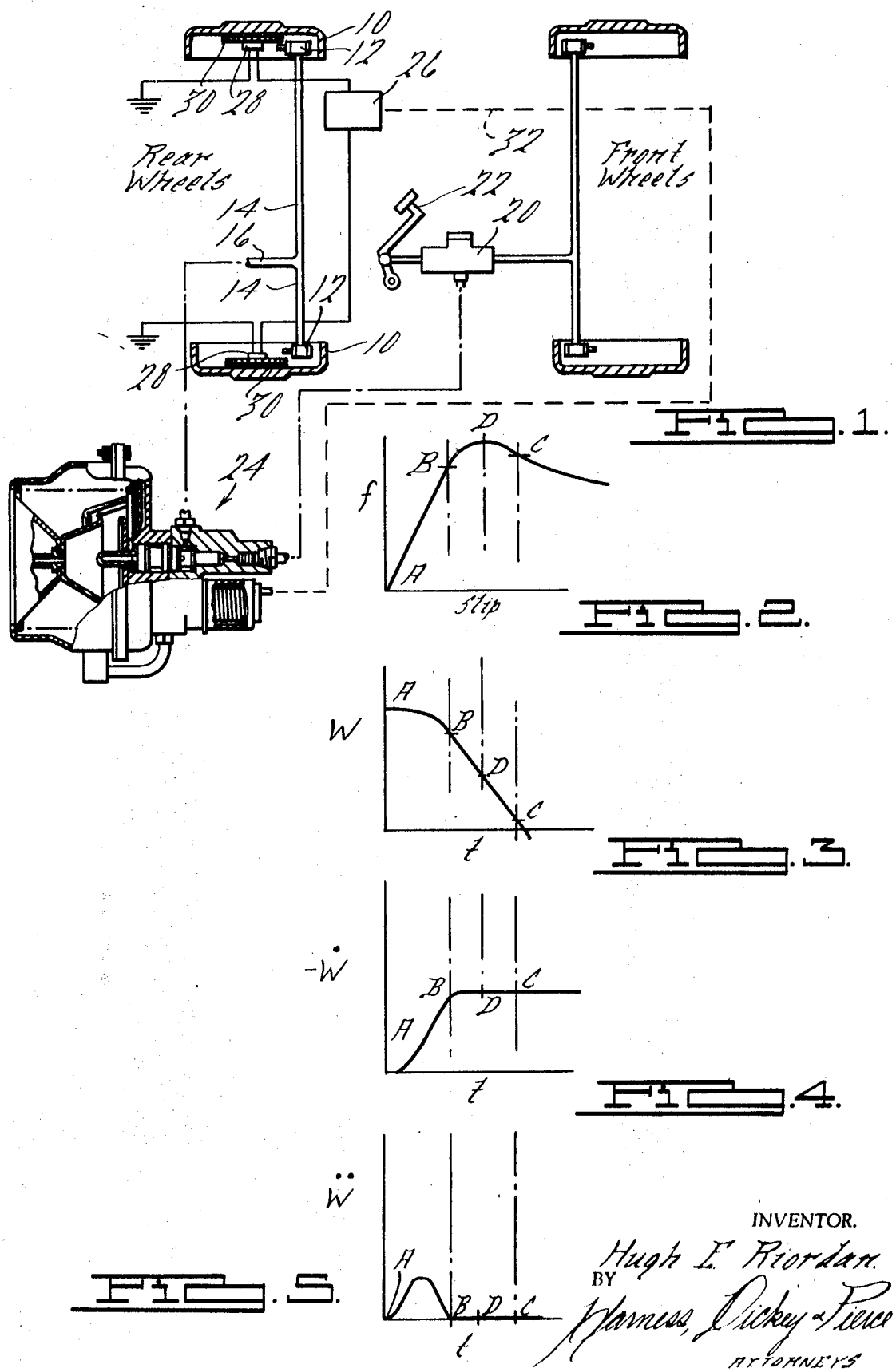

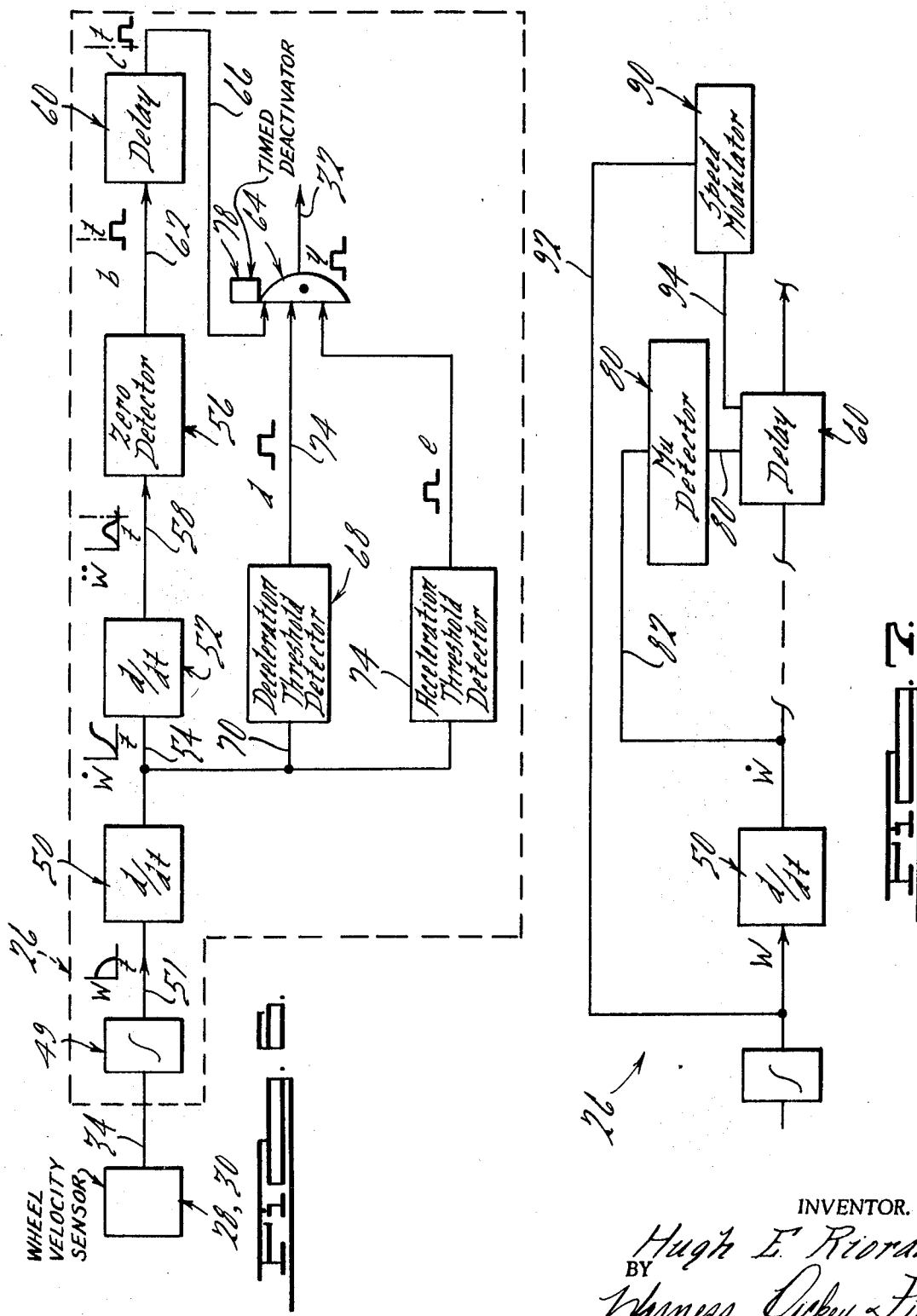

SKID CONTROL SYSTEM

SUMMARY BACKGROUND OF THE INVENTION

The present invention relates to skid control systems. In skid control systems, when it is determined that the wheels (or wheel) are in an incipient skid condition the brake pressure is relieved permitting the wheels to spin up. However, it is desirable to control or modulate brake pressure in such a way as to optimize the retarding force. If the brake pressure is relieved prematurely braking will be less effective since the point of maximum retarding force will not be attained. If the brake pressure is relieved too late the wheels will be slipping excessively (or become locked up) and again maximum retarding force will not be attained. In the present invention the point of maximum retarding force is anticipated such that the brake pressure will be effectively relieved at or near the point of maximum retarding force.

It is an object of the present invention to provide a skid control system in which the modulation of brake pressure occurs at or near the point of optimum retarding force.

Further objects, features and advantages of this invention will become apparent from a consideration of the following description, the appended claims and the accompanying drawings in which:

FIG. 1 is a schematic diagram illustrating a representative vehicle brake system which may be utilized in conjunction with the control system of the present invention;

FIG. 2 is a graph illustrating the retarding force versus slip relationship for a wheeled vehicle;

FIG. 3 is a graph illustrating the wheel velocity versus time relationship of a wheel to be controlled;

FIG. 4 is a graph illustrating the wheel deceleration versus time relationship of the curve of FIG. 3;

FIG. 5 is a graph illustrating the first derivative of wheel deceleration versus time relationship of the curve of FIG. 4;

FIG. 6 is a block diagram illustrating a system for accomplishing the features of the present invention; and FIG. 7 is a modified block diagram of a modified system.

The skid control system of the present invention is particularly adapted to be utilized and will be described specifically for use with an automotive vehicle. However, it should be understood that the features of the invention may be utilized with other types of vehicles including aircraft and other wheeled vehicles which are adapted to provide braking through a wheel type of element. In the case of an automotive use, the system of the present invention may be utilized in connection with either the front wheels, the rear wheels or both the front and rear wheels. However, for simplicity, the system will be described for use in conjunction only with the rear wheels of an automotive vehicle.

Referring now to FIG. 1, there is illustrated, in schematic form, a skid control system which may be utilized in conjunction with the rear wheels of an automotive vehicle, the rear wheels of the vehicle including brake drums 10 and wheel brake cylinders 12. The brake cylinders 12 are operated by applying pressure through hydraulic lines 14 which are connected to a common fluid line 16, the pressure being supplied by a master cylinder assembly 20 of conventional construction and manually actuated through a foot pedal 22. The fluid pressure from master cylinder 20 can be controlled or modulated, in a manner to be described, by means of a modulating valve 24 connected between the fluid lines 16 and 18.

The modulating valve 24 in the present system is actuated in accordance with an electrical signal obtained from an electrical control module 26. The module 26 receives information from wheel velocity sensors 28 which are associated with each of the brake drums 10 by means of a rotating element 30 for sensing the angular velocity of the wheel. Any suitable wheel velocity sensor may be utilized with the system of the present invention and accordingly, the details of the sensor 28 and rotating element 30 also have been omitted for simplicity.

As will be explained hereinafter, the control module 26 is constructed to sense the occurrence of an incipient skid condition and to provide an output signal in response thereto resulting in the brake pressure being relieved; the module 26 also senses when release of brake pressure should discontinue and provides another signal when brake pressure should be reapplied. The output or control signals are transmitted, by means of conductor 32, to the modulating valve 24. In the system of the present invention the control module 26 provides an "on" or "off" signal and the valve 24 will relieve or reapply brake pressure in response thereto. The valve 24 can be of the type shown in the copending U.S. Pat. application of Every et al., Ser. No. 642,861, filed June 1, 1967, now U.S. Pat. No. 3,515,440. It is to be understood, however, that such a valve is shown for illustrative purposes only and other types of modulating valves or means of modulation could be employed.

As previously noted, it is desirable to have brake pressure at or near the point at which maximum retarding force occurs. Looking now to FIGS. 2–5, FIG. 2 shows the relationship between retarding force F and slip i.e. vehicle velocity minus wheel velocity. From points A to B retarding force F increases generally linearly with slip. At point D the retarding force is a maximum. At point C slip is excessive, retarding force F is decreasing and the wheels are approaching a locked wheel condition. To optimize braking of the vehicle it is desirable to relieve brake pressure at the point D of maximum retarding force F. FIG. 3 is an actual representation of wheel speed versus time. Note that from points A to B the curve is rounded. This is believed to be caused by time lags in brake pressure buildup and brake response. The straight portion from points B to C can be attributed to the rounding of the B–C region of the retarding force versus slip curve (FIG. 2). Thus it appears that in the B–C region the road to tire coefficient of friction is decreasing or beginning to decrease as a result of increased slip. Note, in the curve of FIG. 3 the point D of maximum retarding force merely lies along the straight line (B to C) and is not readily discernible. The point B, however, can be discerned since it is the point at which the relationship of wheel velocity W versus time begins to be linear. In FIG. 4 the first derivative $\dot{W}$ (or deceleration) versus time relationship shows the point B appears at the point at which wheel deceleration becomes a constant, i.e. region of points B to C of constant amplitude. In FIG. 5 the second derivative $\ddot{W}$ versus time relationship shows that at the point B, the amplitude of $\ddot{W}$ is zero.

Thus the occurrence of point B can be readily determined since the occurrence of a zero amplitude can be readily detected. In the present system the occurrence of point B is detected and, by use of an appropriate time delay, brake pressure is relieved after a time interval selected to permit the brake pressure to continue retarding the wheel until the point D of maximum retarding force approximately occurs. In this manner skid control can be provided while optimizing retarding force and minimizing stopping distance. An appropriate system is shown in block diagram form in FIG. 6.

In FIG. 6 the speed signal from sensors 28, 30 is transmitted to the module 26 and to velocity section 49, therein, via conductor 34. The velocity section 49 provides an output signal W having a magnitude indicative of the wheel speed and this signal is transmitted to first derivative section 50 via conductor 51.

The section 50 differentiates the wheel velocity signal W and provides an acceleration (or deceleration) signal $\dot{W}$ which is transmitted to a second derivative section 52 via conductor 54. Section 52 senses deceleration only and differentiates signal $\dot{W}$ (when negative) to provide a second derivative signal $\ddot{W}$. The signal $\ddot{W}$ is transmitted to a zero detector section 56 via conductor 58 which when signal $\ddot{W}$ reaches zero provides an output signal b. Thus output signal b will be provided when the point B has been reached on the curves of FIGS. 2–5. Signal b is then transmitted to a time delay section 60 via conductor 62. Delay section 60 provides an output signal c a preselected time after signal b is received. As noted, the time is selected to permit the point D, on curves 2–5, to be reached.

This time delay as selected can also compensate for reaction time of the modulating valve 24 as well as of the brake system of the vehicle. The signal $c$ is transmitted to output section 64 via conductor 66. When actuated the output section 64 provides output signal $y$ to conductor 32 to actuate modulating valve 24 to relieve brake pressure. The output section 64, however, requires signals in addition to signal $c$ to cause control output signal $y$ to be transmitted.

From FIG. 5 it can be seen that the second derivative signal $\ddot{W}$ can be at zero at some point other than B, e.g. point A. To prevent unwanted relief of brake pressure and unwanted actuation of modulating valve 24, a threshold detector 68 is utilized. The detector 68 receives deceleration signal $\dot{W}$ (it senses only deceleration) from derivative section 50 via conductor 70 and provides an output signal $d$ when the signal $\dot{W}$ indicates that wheel deceleration has exceeded a preselected magnitude corresponding to a point near, but below, point B on FIG. 2. This magnitude can be readily determined since the deceleration rate at which excessive slip occurs can be approximated; it is necessary merely to set the threshold at section 68 at some magnitude below the excessive slip magnitude and hence below point B. When both signals $c$ and $d$ are received by output section 64 it will be actuated to provide signal $y$ whereby valve 24 will be actuated to initiate brake pressure relief.

With brake pressure relieved the wheels can spin up and the signal $\dot{W}$ will provide an indication of wheel acceleration. The acceleration signal $\dot{W}$ from section 50 is transmitted to acceleration threshold detector 72 via conductor 74. When the acceleration rate reaches a determinable amplitude the velocity of the wheels is rapidly approaching vehicle speed and the brakes should now be reapplied.

The threshold detector 72 is set at such a determinable value and when this value is attained by signal $\dot{W}$ detector 72 will provide signal $e$. Signal $e$ is transmitted to output section 64 via conductor 76 and its occurrence will deactuate section 64 whereby brake pressure will be reapplied. In addition to the above the output section 64 can have an appropriate time out section 78 which, in the event the selected acceleration rate is not timely attained, will deactuate section 64 a preselected time interval after section 64 has been actuated. The time out section 78 and acceleration threshold section 72 provide means for reapplying the brakes which can accommodate different tire to road friction conditions.

Thus with the system shown and described brake pressure relief can be caused to occur at or very near the point of maximum retarding force.

FIG. 7 shows a modified form in which various mu (tire to road) conditions can be accommodated. Thus in FIG. 7 a mu detector section 80 receives the acceleration signal $\dot{W}$ from derivative section 50 via conductor 82. A high magnitude of acceleration during spin up indicates a high mu surface while a low magnitude indicates a low mu surface. For low mu surface conditions the time delay of section 60 should be less than for high mu conditions. Thus the interval of delay, by section 60 will be varied in accordance with the magnitude of wheel acceleration as in accordance with the signal from mu detector section 80 via conductor 84. In addition, at higher vehicle and wheel speeds the point D will be reached slower than at lower vehicle and wheel speeds. Hence the delay provided by section 60 will be also varied in accordance with the wheel velocity signal $W$. A wheel speed modulator section 90 receives the wheel velocity signal $W$ via conductor 92 and is connected to delay section 60 via conductor 94 such that the delay interval will be shorter at higher wheel speeds. The wheel speed section 90 will store the original amplitude of wheel velocity and by an appropriate timing circuit will permit the signal to decay at a selected rate, greater than wheel deceleration, and will be reset at each control cycle to an amplitude indicative of maximum wheel velocity during the cycle; the latter is to provide a smooth response from wheel speed section 90 since the velocity signal $W$ will vary substantially during a control cycle. The latter will also be an approximation of vehicle velocity, The remainder of the system could be the same as that shown in FIG. 6.

While it will be apparent that the preferred embodiment of the invention disclosed is well calculated to fulfill the objects above stated, it will be appreciated that the invention is susceptible to modification, variation and change without departing from the proper scope or fair meaning of the invention.

What is claimed is:

1. A skid control system for controlling the fluid pressure to brakes of at least one wheel of a wheeled vehicle comprising: first means for providing a first signal having a magnitude indicative of the speed of the wheel, second means for determining the second derivative of said first signal and for providing a second signal only when the second derivative of said first signal is approximately zero, third means for sensing a skid condition and for providing a third signal when a skid condition exists, and fourth means including modulating means actuable to reduce the fluid pressure to the brakes in response to said second signal and said third signal when the retarding force of said at least one wheel is approximately at a maximum.

2. A skid control system for controlling the fluid pressure to brakes of at least one wheel of a wheeled vehicle comprising: first means for providing a first signal having a magnitude indicative of the speed of the wheel, second means for providing a second signal only when the second derivative of said first signal is approximately zero, third means for sensing a skid condition and for providing a third signal when a skid condition exists, and fourth means including delay means for delaying said second signal for a preselected interval after said first signal is approximately zero to maximize the retarding force from braking, further including modulating means actuable to reduce the fluid pressure to the brakes in response to said second signal and said third signal.

3. The system of claim 2 further comprising inhibiting means for detecting the approximate occurrence of a skid condition and for preventing actuation of said modulating means until such occurrence.

4. The system of claim 3 further comprising velocity means for varying said interval of said delay means in accordance with an approximation of vehicle velocity such that said interval is less for lower vehicle velocities.

5. The system of claim 3 further comprising mu sensing means for providing an indication of the mu between the wheel and the road surface and for varying said interval in said delay means such that said interval is shorter for lower mu conditions.

6. The system of claim 4 further comprising mu sensing means for providing an indication of the mu between the wheel and the road surface and for varying said interval in said delay means such that said interval is shorter for lower mu conditions.

7. The system of claim 6 with said mu sensing means providing an indication of mu in accordance with the magnitude of acceleration of the wheel during brake pressure relief.

8. The apparatus of claim 7 further comprising means for actuating said modulating means to reapply brake pressure at a determinable occurrence after pressure relief.

9. The system of claim 2 further comprising velocity means for varying said interval of said delay means in accordance with an approximation of vehicle velocity such that said interval is less for lower vehicle velocities.

10. The system of claim 2 further comprising mu sensing means for providing an indication of the mu between the wheel and the road surface and for varying said interval in said delay means such that said interval is shorter for lower mu conditions.